United States Patent
Murata

(10) Patent No.: US 12,489,141 B2
(45) Date of Patent: Dec. 2, 2025

(54) PACKAGING MATERIAL FOR SOLID-STATE BATTERIES AND SOLID-STATE BATTERY INCLUDING THE PACKAGING MATERIAL

(71) Applicant: TOPPAN INC., Tokyo (JP)

(72) Inventor: Koji Murata, Tokyo (JP)

(73) Assignee: TOPPAN INC., Tokyo (JP)

( * ) Notice: Subject to any disclaimer, the term of this patent is extended or adjusted under 35 U.S.C. 154(b) by 529 days.

(21) Appl. No.: 17/891,377

(22) Filed: Aug. 19, 2022

(65) Prior Publication Data

US 2022/0399570 A1    Dec. 15, 2022

Related U.S. Application Data

(63) Continuation of application No. PCT/JP2021/004790, filed on Feb. 9, 2021.

(30) Foreign Application Priority Data

Feb. 25, 2020 (JP) ................. 2020-029521

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 50/117* (2021.01);
(Continued)

(58) Field of Classification Search
CPC ......... H01M 10/0562; H01M 10/0525; H01M 10/42; H01M 50/122; H01M 50/1243; H01M 50/145; H01M 50/105; H01M 50/131; H01M 50/668; H01M 50/126; H01M 50/117; H01M 50/119;
(Continued)

(56) References Cited

U.S. PATENT DOCUMENTS

| | | | |
|---|---|---|---|
| 2003/0054241 A1* | 3/2003 | Yamashita | H01M 50/198 429/184 |
| 2012/0015220 A1 | 1/2012 | Kawaoka et al. | |

(Continued)

FOREIGN PATENT DOCUMENTS

| | | |
|---|---|---|
| JP | H02-021869 A | 1/1990 |
| JP | 2004-296174 A | 10/2004 |

(Continued)

OTHER PUBLICATIONS

WO_2020158873_A1 (Year: 2020) Original File and Translation.*
(Continued)

*Primary Examiner* — Milton I Cano
*Assistant Examiner* — Katherine J Metzger
(74) *Attorney, Agent, or Firm* — Foley & Lardner LLP

(57) ABSTRACT

A packaging material for solid-state batteries according to one aspect of the present disclosure contains sulfide-based solid electrolytes, including at least a substrate layer, a barrier layer, and a sealant layer in this order, in which at least one of the layers constituting the packaging material contains a color developer that changes color when reacting with hydrogen sulfide.

13 Claims, 5 Drawing Sheets

(51) Int. Cl.
*H01M 50/117* (2021.01)
*H01M 50/119* (2021.01)
*H01M 50/122* (2021.01)
*H01M 50/124* (2021.01)
*H01M 50/126* (2021.01)
*H01M 50/128* (2021.01)
*H01M 50/131* (2021.01)
*H01M 50/145* (2021.01)
*H01M 50/60* (2021.01)
*H01M 50/105* (2021.01)

(52) U.S. Cl.
CPC ....... *H01M 50/119* (2021.01); *H01M 50/122* (2021.01); *H01M 50/124* (2021.01); *H01M 50/1243* (2021.01); *H01M 50/1245* (2021.01); *H01M 50/126* (2021.01); *H01M 50/128* (2021.01); *H01M 50/131* (2021.01); *H01M 50/145* (2021.01); *H01M 50/668* (2021.01); *H01M 50/105* (2021.01); *H01M 2300/0068* (2013.01)

(58) Field of Classification Search
CPC .......... H01M 50/124; H01M 50/1245; H01M 50/128; H01M 2300/0068; H01M 2200/00; H01M 2220/20; H01M 50/178; H01M 50/10; H01M 50/102; H01M 50/103; H01M 50/107; H01M 50/109; H01M 50/11; H01M 50/112; H01M 50/121; H01M 50/129; H01M 50/123; H01M 50/125; H01M 50/127; Y02E 60/10
See application file for complete search history.

(56) References Cited

U.S. PATENT DOCUMENTS

| | | | |
|---|---|---|---|
| 2018/0034010 A1* | 2/2018 | Liao | H01M 50/145 |
| 2019/0058168 A1* | 2/2019 | Pozin | H01M 50/59 |
| 2019/0221785 A1* | 7/2019 | Kim | H01M 50/342 |
| 2021/0280843 A1 | 9/2021 | Sugiyo et al. | |

FOREIGN PATENT DOCUMENTS

| | | | | |
|---|---|---|---|---|
| JP | 2007-257974 A | | 10/2007 | |
| JP | 2008-001032 A | | 1/2008 | |
| JP | 2008-004506 A | | 1/2008 | |
| JP | 2008-103288 A | | 5/2008 | |
| JP | 2009209200 A | * | 9/2009 | |
| JP | 2015-102473 A | | 6/2015 | |
| JP | 2015179618 A | * | 10/2015 | |
| JP | 2017001187 A | * | 1/2017 | |
| JP | 2018107062 A | * | 7/2018 | ............ B32B 15/08 |
| WO | WO-2020/013295 A1 | | 1/2020 | |

OTHER PUBLICATIONS

Office Action issued in corresponding Japanese Patent Application No. 2020-029521 dated Aug. 6, 2024 (6 pages).
Office Action issued in corresponding Japanese Patent Application No. 2020-029521 dated Jun. 28, 2024 (10 pages).
Third Party Observations issued in corresponding European Patent Application No. 21760514.6 dated Nov. 27, 2024.
Extended European Search Report issued in corresponding European Patent Application No. 21760514.6, dated Jul. 20, 2023.
Opposition issued in corresponding Japanese Patent No. 7631665 dated Sep. 3, 2025.

* cited by examiner

PACKAGING MATERIAL FOR SOLID-STATE BATTERIES AND SOLID-STATE BATTERY INCLUDING THE PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/004790, filed on Feb. 9, 2021, which in turn claims the benefit of JP 2020-029521 filed Feb. 25, 2020 the disclosures of all which are incorporated herein by reference in its entirety.

TECHNICAL FIELD

The present disclosure relates to a packaging material for solid-state batteries and a solid-state battery including the packaging material, and more particularly relates to a packaging material for solid-state batteries containing sulfide-based solid-state electrolytes, and a solid-state battery including the packaging material.

BACKGROUND

Secondary batteries such as lithium ion batteries are widely used in portable electronic devices, electric vehicles and hybrid electric vehicles which use electricity as a power source, and others. As batteries having safety higher than that of lithium ion batteries, solid-state lithium batteries containing an inorganic solid-state electrolyte instead of an organic solvent electrolyte have been studied. Solid-state lithium batteries, which are unlikely to cause thermal runaway resulting from a short circuit, have better safety than a lithium ion battery.

Of inorganic solid-state electrolytes, sulfide-based solid-state electrolytes have higher ionic conductivity than oxide-based solid-state electrolytes or others, and have multiple advantages in obtaining a solid-state battery having higher performance. However, since solid-state batteries containing a sulfide-based solid-state electrolyte contain sulfur, moisture having entered a battery may react with the sulfur, and toxic hydrogen sulfide ($H_2S$) may be generated. This raises the concern that this hydrogen sulfide might leak in response to the breakage of the packaging material of the battery. For preventing the leakage of hydrogen sulfide, for example, Patent Literatures 1 and 2 propose a solid-state battery having a safety design to capture the generated hydrogen sulfide for detoxification.

[Citation List] [Patent Literature] [PTL 1] JP 2008-103283 A; [PTL 2] JP 2008-103288 A.

SUMMARY OF THE INVENTION

Technical Problem

The generation of hydrogen sulfide in a solid-state battery containing a sulfide-based solid-state electrolyte indicates a certain abnormality such as progression of deterioration of the sulfide-based solid-state electrolyte or breaking of the packaging material. A solid-state battery having such an abnormality is desirably, for example, immediately replaced. However, since hydrogen sulfide has an irritating odor but is colorless, it is difficult to recognize the generation of hydrogen sulfide. Furthermore, the methods described in Patent Literatures 1 and 2 cannot eliminate the abnormality itself of the solid-state battery, but rather can cause a delay in finding the abnormality, even if the generated hydrogen sulfide could be detoxified.

The present disclosure has been made in view of the above-described problems of known technologies, and has as its object to provide a packaging material for solid-state batteries which enables an abnormality of a solid-state battery to be found at an early stage, and a solid-state battery including the packaging material.

Solution to Problem

For achieving the above-described object, the present disclosure provides a packaging material for solid-state batteries containing a sulfide-based solid electrolyte, which includes at least a substrate layer, a barrier layer, and a sealant layer in this order, in which at least one of the layers constituting the packaging material contains a color developer that reacts with hydrogen sulfide and thereby changes color.

According to the packaging material, a layer that contains the color developer is included. Therefore, the color-developer-containing layer can change in color in response to the generation of hydrogen sulfide in a solid-state battery containing a sulfide-based solid-state electrolyte. Accordingly, generation of hydrogen sulfide can be visually detected, and abnormalities of the solid-state battery can be visually detected at an early stage.

Here, the substrate layer side of the packaging material is defined as an outer side, and the sealant layer side is defined as an inner side. When the color-developer-containing layer is disposed on the inner side relative to the barrier layer, hydrogen sulfide generated inside the packaging material can be detected, and abnormalities of the solid-state battery can be visually found at an early stage. It should be noted that when the barrier layer is opaque, color change of a layer on the inner side relative to the barrier layer can be identified by, for example, observing the end portion of the battery (the cross section of the packaging material). The end portion of the battery may be observed visually or through a loupe, a microscope, and others. On the other hand, when the color-developer-containing layer is disposed on the outer side relative to the barrier layer, hydrogen sulfide generated inside the packaging material passes through a portion of a defect such as a pinhole, if any, of the barrier layer, and thus, color change of the color-developer-containing layer becomes significant near the defected portion. This facilitates, in addition to finding of an abnormality in the solid-state battery, identification of the defective portion. Also, when solid-state batteries are modularized for use, and the color-developer-containing layer is disposed on the outer side relative to the barrier layer, leakage of hydrogen sulfide resulting from abnormalities occurring in one of the solid-state batteries in the module causes a packaging material of a solid-state battery around the leakage to change in color. This facilitates detection of abnormalities in the module and identification of a solid-state battery having the abnormalities.

The packaging material for a solid-state battery may further include at least one of a first adhesive layer disposed between the substrate layer and the barrier layer, a second adhesive layer disposed between the barrier layer and the sealant layer, and an adhesive resin layer disposed between the barrier layer and the sealant layer. In the packaging material, at least one layer selected from the group consisting of the first adhesive layer, the second adhesive layer, the adhesive resin layer, and the sealant layer may contain the color developer. When the specific layer contains a color developer, color change is likely to occur in the color-developer-containing layer in response to the generation of hydrogen sulfide in the solid-state battery containing a sulfide-based solid-state electrolyte. This facilitates visual detection of an abnormality of the solid-state battery at an early stage.

The packaging material for a solid-state battery may further include at least one of the first adhesive layer disposed between the substrate layer and the barrier layer, the second adhesive layer disposed between the barrier layer and the sealant layer, and the adhesive resin layer disposed between the barrier layer and the sealant layer, and a protective layer disposed on a surface facing away from the barrier layer of the substrate layer. In the packaging material, at least one layer selected from the group consisting of the protective layer, the first adhesive layer, the second adhesive layer, the adhesive resin layer, and the sealant layer may contain the color developer. When the specific layer contains a color developer, color change is likely to occur in the color-developer-containing layer in response to the generation of hydrogen sulfide in the solid-state battery containing a sulfide-based solid-state electrolyte. This facilitates visual detection of an abnormality of the solid-state battery at an early stage.

In the packaging material for solid-state batteries, the color developer may contain at least one element selected from the group consisting of Cu, Pb, Ag, Mn, Ni, Co, Sn, and Cd. The color developer containing the above-described element is likely to react with sulfur from the hydrogen sulfide and change color, and the color change is likely to be visually recognized. This further facilitates visual detection of an abnormality of the solid-state battery at an early stage.

In the packaging material for solid-state batteries, the color developer may contain at least one selected from the group consisting of $CuSO_4$, $Pb(CH_3COO)_2$, and $Ag_2SO_4$. The color developer containing the above-described compound is likely to react with sulfur from hydrogen sulfide and change color, and the color change is likely to be visually recognized. This further facilitates visual detection of an abnormality of the solid-state battery at an early stage.

In the packaging material for solid-state batteries, the content of the color developer in the color-developer-containing layer may be not less than 0.01 mass % and not more than 30 mass % relative to the total amount of the layer. When the content of the color developer is not less than the above-described lower limit value, color change is further likely to be visually recognized. When not more than the above-described upper limit value, functions (such as adhesiveness strength and sealing strength) of the color-containing-layer can be prevented from deteriorating.

In the packaging material for solid-state batteries, at least one of the layers constituting the packaging material may contain a hydrogen sulfide adsorbent which is different to the color developer. In this case, in addition to detecting abnormalities in the solid-state battery at an early stage, the generated hydrogen sulfide can be detoxificated.

When the substrate layer side of the packaging material for solid-state batteries is defined as an outer side, and the sealant layer side is defined as an inner side, at least one of the layers disposed on the inner side relative to the barrier layer may contain the color developer, and at least one of the color-developer-containing layer and layers disposed on the barrier layer side relative to the color-developer-containing layer may contain the hydrogen sulfide adsorbent. When a layer disposed on the inner side relative to the color-developer-containing layer contains the hydrogen sulfide adsorbent, there is a risk that hydrogen sulfide generated inside the packaging material may firstly contact the hydrogen sulfide adsorbent and be adsorbed or decomposed, which reduces the amount of hydrogen sulfide reaching the color-developer-containing layer and decreases color change. On the other hand, when the hydrogen sulfide adsorbent is contained in the above-described specific layer, hydrogen sulfide generated inside the packaging material contacts the color-developer-containing layer and causes the color-developer-containing layer to change in color. Thereafter, the hydrogen sulfide is adsorbed or decomposed and detoxificated by the hydrogen sulfide adsorbent contained in the color-developer-containing layer or a layer on the barrier layer side relative to the color-developer-containing layer. Therefore, the color change due to hydrogen sulfide and the detoxification of hydrogen sulfide can both proceed at a high level.

In the packaging material for solid-state batteries, the hydrogen sulfide adsorbent may contain zinc oxide and/or zinc ions. A hydrogen sulfide adsorbent containing zinc oxide and/or zinc ions is preferable, because the property of adsorbing or decomposing hydrogen sulfide is excellent, and cost and handleability are good.

In the packaging material for solid-state batteries, the combined content of the color developer and the hydrogen sulfide adsorbent in the color-developer-containing layer may be not less than 0.01 mass % and not more than 30 mass % relative to the total amount of the layer.

In the packaging material for solid-state batteries, an anti-corrosion treatment layer may be disposed on one or both surfaces of the barrier layer. When the anti-corrosion treatment layer is provided, corrosion of the barrier layer can be prevented. In addition, when the anti-corrosion treatment layer is placed between the barrier layer and the neighboring layer, an adhesive force therebetween can be enhanced. Also, when a metal foil such as an aluminum foil is used as the barrier layer, there is a risk that the metal foil may undergo a color change due to hydrogen sulfide, and barrier performance may decrease accordingly. Also, since water, acid, or the like can be produced as a reaction product between the color developer or the hydrogen sulfide adsorbent and hydrogen sulfide, there is a risk that the product may corrode the metal foil. Such deterioration of the metal foil can be prevented by providing an anti-corrosion treatment layer.

The present disclosure also provides a solid-state battery that includes a battery element containing a sulfide-based solid-state electrolyte, a current-extracting terminal extending from the battery element, and the packaging material for solid-state batteries according to the present disclosure which sandwiches the current-extracting terminal and houses the battery element.

Advantageous Effects of the Invention

According to the present disclosure, there can be provided a packaging material for solid-state batteries which enables an abnormality of the solid-state battery to be found at an early stage, and a solid-state battery including the packaging material.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

[Packaging Material for All-Solid-State Batteries]

Figure 1:
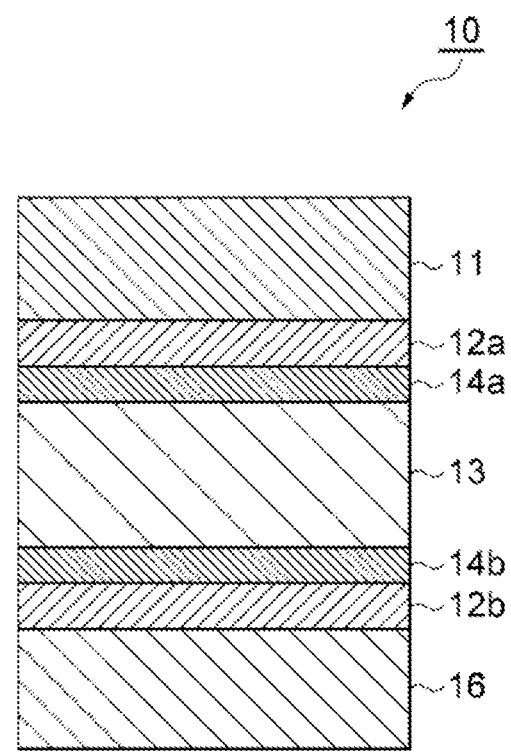
FIG. 1 is a schematic cross-sectional view of a packaging material for solid-state batteries according to an embodiment of the present disclosure.

FIG. 1 is a cross-sectional view schematically showing an embodiment of the packaging material for solid-state batteries according to the present disclosure. As shown in FIG. 1, a packaging material (packaging material for solid-state batteries) 10 of the present embodiment is a laminate including a substrate layer 11, a first adhesive layer 12a disposed on one surface of the substrate layer 11, a barrier layer 13 disposed on the side of the first adhesive layer 12a facing away from the substrate layer 11 and having anti-corrosion treatment layers (a first anti-corrosion treatment layer 14a and a second anti-corrosion treatment layer 14b) on the respective surfaces thereof, a second adhesive layer 12b disposed on the side of the barrier layer 13 facing away from the first adhesive layer 12a, and a sealant layer 16 disposed on the side of side opposite the barrier layer 13 of the second adhesive layer 12b. The first anti-corrosion treatment layer 14a is disposed on the surface of the barrier layer 13 facing away from the substrate layer 11, and the second anti-corrosion treatment layer 14b is disposed on the sealant layer 16 side surface of the barrier layer 13. In the packaging material 10, the substrate layer 11 is the outermost layer, and the sealant layer 16 is the innermost layer. That is, the packaging material 10 is used so that the substrate layer 11 faces the outside of the solid-state battery and the sealant layer 16 faces the inside of the solid-state battery.

At least one of the layers constituting the packaging material 10 of the present embodiment contains a color developer that reacts with hydrogen sulfide and changes in color. Also, at least one of the layers constituting the packaging material 10 of the present embodiment may contain a hydrogen sulfide adsorbent. Hereinafter, the layers constituting the packaging material 10 will be specifically described.

<Substrate Layer 11>

The substrate layer 11 imparts heat resistance in a sealing step during production of a solid-state battery, and prevents the occurrence of pinholes that may occur during molding or distribution. Particularly for a packaging material of large solid-state batteries, abrasion resistance, chemical resistance, insulation properties, and the like can be imparted.

The substrate layer 11 is preferably a layer formed of a resin having insulation properties. Examples of usable resins include polyester resin, polyamide resin, polyimide resin, polyamide-imide resin, polyetherketone resin, polyphenylene sulfide resin, polyether imide resin, polysulfone resin, fluororesins, phenol resin, melamine resin, urethane resin, allyl resin, silicon resin, epoxy resin, furan resin, and acetyl cellulose resin.

The form of these resins when used in the substrate layer 11 may be any one of a stretched or unstretched film and a coat. Also, the substrate layer 11 may be single-layered or multiple-layered. When multiple-layered, different resins can be combined for use. When a film is used, it may be obtained by co-extrusion or by lamination through an adhesive agent. When a coating is used, it may be obtained by performing coating the number of times corresponding to the number of layers. Also, a film and a coating can be combined to obtain multiple layers.

Among these resins, polyester resins and polyamide resins, which are excellent in molding properties, are preferable as a material for constituting the substrate layer 11. Examples of polyester resins include polyethylene terephthalate, polybutylene terephthalate, and polyethylene naphthalate. Examples of polyamide resins constituting a polyamide film include Nylon-6, Nylon-6,6, a copolymer of Nylon-6 and Nylon-6,6, Nylon-6, Nylon-9T, Nylon-10, polymetaxylylene adipamide (MXD6), Nylon-11, and Nylon-12.

When these resins are used in a film form, a biaxially stretched film is preferable. Examples of a stretching method in the biaxially stretched film include a sequential biaxial stretching method, a tubular biaxial stretching method, and a simultaneous biaxial stretching method. From the viewpoint of obtaining better deep drawing properties, the biaxially stretched film is preferably stretched by a tubular biaxial stretching method.

The substrate layer 11 preferably has a thickness of 6 to 40 μm and more preferably 10 to 30 μm. When the substrate layer 11 has a thickness of 6 μm or more, the packaging material 10 tends to have improved pinhole resistance and insulation properties. When the substrate layer 11 has a thickness of 40 μm or less, the packaging material 10 tends to have a reduced total thickness.

The substrate layer 11 preferably has a melting point peak temperature that is higher than the melting point peak temperature of the sealant 16, and further preferably higher by 30° C. or more than the melting point peak temperature of the sealant layer 16, in order to suppress deformation of the substrate layer 11 during sealing.

<First Adhesive Layer 12a>

The first adhesive layer 12a is a layer for bonding the substrate layer 11 and the barrier layer 13. A specific example of a material for constituting the first adhesive layer 12a is a polyurethane resin obtained by allowing an isocyanate compound having two or more functional groups (a polyfunctional isocyanate compound) to act on a base compound such as polyester polyol, polyether polyol, acrylic polyol, or carbonate polyol. These various polyols can be used singly or in combination of two or more, depending on the functions and performance required of the packaging material 10. Another example is, but is not limited to, a product obtained by formulating a curing agent in epoxy resin as a base compound. Also, other various additives and a stabilizer may be formulated to the above-described adhesive, depending on performance required of the adhesive.

Although not particularly limited, the thickness of the first adhesive layer 12a is, for example, preferably 1 to 10 μm and more preferably 2 to 7 μm, from the viewpoint of obtaining desired adhesion strength, followability, processability, and the like.

<Barrier Layer 13>

The barrier layer 13 has water vapor barrier properties to prevent moisture from entering the inside of a solid-state battery. Also, the barrier layer 13 may have ductility for deep drawing. The barrier layer 13 may be, for example, various types of metal foils such as an aluminum foil, a stainless steel foil, or a copper foil, or a metal vapor deposition film, an inorganic oxide vapor deposition film, a carbon-containing inorganic oxide vapor deposition film, a film provided with such a vapor deposition film, or the like. As the films provided with the vapor deposited films, there can be used an aluminum vapor deposited film and an inorganic oxide vapor deposited film. These can be used singly or in combination of two or more. The barrier layer 13 is preferably a metal foil and more preferably an aluminum foil, in view of weight (specific gravity), moisture resistance, processability, and cost.

As the aluminum foil, there can be preferably used a soft aluminum foil, particularly subjected to an annealing treatment, from the viewpoint of imparting desired ductility during molding. However, an iron-containing aluminum foil is more preferably used for a purpose of imparting better pinhole resistance and ductility during molding. The iron content in the aluminum foil is preferably in the range of 0.1 to 9.0 mass % relative to 100 mass % of the aluminum foil, and more preferably in the range of 0.5 to 2.0 mass %. When the iron content is 0.1 mass % or more, a packaging material 10 having better pinhole resistance and ductility can be obtained. When the iron content is 9.0 mass % or less, a packaging material 10 having better flexibility can be obtained. An untreated aluminum foil can be used as the aluminum foil, but an aluminum foil subjected to a degreasing treatment is preferably used in view of imparting corrosion resistance. The degreasing treatment of the aluminum foil may be performed on only one surface or both surfaces of the aluminum foil.

Although not particularly limited, the thickness of the barrier layer 13 is preferably 9 to 200 μm and more preferably 15 to 100 μm, in consideration of barrier properties, pinhole resistance and processability.

<First and Second Anti-Corrosion Treatment Layers 14a and 14b>

The first and second anti-corrosion treatment layers 14a and 14b are disposed for preventing corrosion of a metal foil (a metal foil layer) or others constituting the barrier layer 13. The first anti-corrosion treatment layer 14a increases the adhesive force between the barrier layer 13 and the first adhesive layer 12a. The second anti-corrosion treatment layer 14b increases the adhesive force between the barrier layer 13 and the second adhesive layer 12b. The first and second anti-corrosion treatment layers 14a and 14b may have the same configuration or different configurations. The first and second anti-corrosion treatment layers 14a and 14b (hereinafter, also merely referred to as the "anti-corrosion treatment layers 14a and 14b") may be formed by, for example, a degreasing treatment, a hydrothermal modification treatment, an anodic oxidation treatment, a chemical conversion treatment, or combinations of these treatments.

Examples of the degreasing treatment include acid degreasing and alkaline degreasing. Examples of the acid degreasing include methods using one or a mixture solution of inorganic acids such as sulfuric acid, nitric acid, hydrochloric acid, and hydrofluoric acid. Use of an acid degreasing agent, as acid degreasing, obtained by dissolving a fluorine-containing compound such as monosodium ammonium difluoride with the above-described inorganic acid is effective in terms of corrosion resistance, particularly when an aluminum foil is used for the barrier layer 13, because not only a degreasing effect of aluminum is obtained, but also a fluoride of aluminum in a passive state can be formed. An example of the alkaline degreasing is a method using sodium hydroxide or the like.

An example of the hydrothermal modification treatment is a boehmite treatment of immersion-treating an aluminum foil in boiling water to which triethanolamine has been added. An example of the anodic oxidation treatment is an alumite treatment.

The type of the chemical conversion treatment includes immersion and coating. Examples of the immersion-type chemical conversion treatment include chromate treatment, zirconium treatment, titanium treatment, vanadium treatment, molybdenum treatment, calcium phosphate treatment, strontium hydroxide treatment, cerium treatment, ruthenium treatment, and various chemical conversion treatments including mixed phases thereof. The coating-type chemical conversion treatment includes a method of applying a coating agent having anti-corrosion performance onto the barrier layer 13.

When any one of the hydrothermal conversion treatment, the anodization treatment, and the chemical conversion treatment, among the above-described anti-corrosion treatments, is used to form at least a part of the anti-corrosion treatment layer, the above-described degreasing treatment is preferably performed in advance. It should be noted that when a degreased metal foil, such as an annealed metal foil, is used as the barrier layer 13, the degreasing treatment does not need to be performed again in forming the anti-corrosion treatment layers 14a and 14g.

The coating agent used for the coating-type chemical conversion treatment preferably contains trivalent chromium. Also, the coating agent may contain at least one polymer selected from the group consisting of a cationic polymer and an anionic polymer described later.

Of the treatments mentioned above, the hydrothermal modification treatment and the anodic oxidation treatment, in particular, dissolve the surface of an aluminum foil with a treatment agent and form an aluminum compound having good corrosion resistance (such as boehmite or alumite). Thus, these treatments, which form a co-continuous structure extending from the barrier layer 13 including an aluminum foil to the anti-corrosion treatment layers 14a and 14b, are encompassed by the definition of a chemical conversion treatment. Also, the anti-corrosion treatment layers 14a and 14b can be formed only by a simple coating method, which is not encompassed by the definition of a chemical conversion treatment as described later. An example of this method includes a method of using a sol of a rare earth element-based oxide such as cerium oxide with a mean particle size of 100 nm or less, as a material that has an anti-corrosion effect (inhibitor effect) for aluminum and is environmentally suitable. Use of this method can impart an anti-corrosion effect to a metal foil such as an aluminum foil, even when an ordinary coating method is used.

Examples of the sol of a rare earth element-based oxide include sols containing various solvents based on water, alcohol, hydrocarbon, ketone, ester, ether, and the like. Of these sols, a water-based sol is preferable.

The sol of a rare earth element-based oxide usually contains, as a dispersion stabilizer, an inorganic acid such as nitric acid, hydrochloric acid, phosphoric acid, or a salt thereof, and an organic acid such as acetic acid, malic acid, ascorbic acid, or lactic acid, for stabilizing the dispersion of the sol. Of these dispersion stabilizers, phosphoric acid, in particular, is expected to provide the packaging material 10 with features of (1) stabilizing dispersion of the sol, (2) improving adhesiveness with the barrier layer 13 taking advantage of an aluminum chelate ability of phosphoric acid, (3) imparting corrosion resistance by trapping aluminum ions (forming a passive state), and (4) improving cohesive forces of the anti-corrosion treatment layers (oxide layers) 14a and 14b because dehydration condensation of phosphoric acid is likely to occur even at low temperature.

Since the anti-corrosion treatment layers 14a and 14b formed of the sol of a rare earth element-based oxide are aggregates of inorganic particles, the cohesive forces of the layers themselves can be lowered even after a step of dry curing. Therefore, the anti-corrosion treatment layers 14a and 14b in this case are preferably compounded with an anionic polymer or a cationic polymer in order to supplement the cohesive forces.

The anti-corrosion treatment layers 14a and 14b are not limited to the above-described layers. For example, the anti-corrosion treatment layers 14a and 14b may be formed using a treating agent obtained by adding phosphoric acid and a chromium compound to a resin binder (such as aminophenol), like a coating-type chromate that is a known technique. With this treating agent, a layer having both an anti-corrosion function and adhesiveness can be obtained. Although the stability of a coating solution needs to be taken into consideration, a layer having both an anti-corrosion function and adhesiveness can be obtained using a previously prepared one-component coating agent containing a sol of a rare earth element-based oxide and a polycationic polymer or a polyanionic polymer.

The mass per unit area of the anti-corrosion treatment layers 14a and 14b, whether a multilayer structure or a monolayer structure, is preferably 0.005 to 0.200 g/m$^2$ and more preferably 0.010 to 0.100 g/m$^2$. When the mass per unit area is 0.005 g/m$^2$ or more, an anti-corrosion function is likely to be imparted to the barrier layer 13. Even when the mass per unit area exceeds 0.200 g/m$^2$, there is little change in the anti-corrosion function. When the sol of a rare earth element-based oxide is used, and the coat is thick, heat-curing during drying can be insufficient, leading to deterioration in the cohesive force. The thicknesses of the anti-corrosion treatment layers 14a and 14b can be converted from their specific gravities.

From the viewpoint that the adhesion between the sealant layer and the barrier layer is more likely to be maintained, for example, the anticorrosion treatment layers 14a and 14b may contain cerium oxide, 1 to 100 parts by mass of phosphoric acid or phosphate with respect to 100 parts by mass of the cerium oxide, and a cationic polymer, or may be formed by applying chemical conversion treatment to the barrier layer 13, or may be formed by applying chemical conversion treatment to the barrier layer 13 and contain a cationic polymer.

<Second Adhesive Layer 12b>

The second adhesive layer 12b is a layer for bonding the barrier layer 13 and the sealant layer 16. A general purpose adhesive for bonding the barrier layer 13 and the sealant layer 16 may be used for the second adhesive layer 12b.

When the anti-corrosion treatment layer 14b is disposed on the barrier layer 13, and the anti-corrosion treatment layer 14b has a layer containing at least one polymer selected from the group consisting of the cationic polymer and the anionic polymer mentioned above, the second adhesive layer 12b preferably contains a compound (hereinafter, also referred to as a "reactive compound") having reactivity with the above-described polymer contained in the second anti-corrosion treatment layer 14b.

For example, when the second anti-corrosion treatment layer 14b contains a cationic polymer, the second adhesive layer 12b preferably contains a compound having reactivity with the cationic polymer. When the second anti-corrosion treatment layer 14b contains an anionic polymer, the second adhesive layer 12b preferably contains a compound having reactivity with the anionic polymer. When the second anti-corrosion treatment layer 14b contains a cationic polymer and an anionic polymer, the second adhesive layer 12b preferably contains a compound having reactivity with the cationic polymer and a compound having reactivity with the anionic polymer. However, the second adhesive layer 12b does not necessarily need to contain the two kinds of compounds, but may contain a compound having reactivity with both the cationic polymer and the anionic polymer. As described herein, the expression "having reactivity" refers to forming a covalent bond with the cationic polymer or the anionic polymer. The second adhesive layer 12b may further contain an acid-modified polyolefin resin.

An example of the compound having reactivity with a cationic polymer is at least one compound selected from the group consisting of a polyfunctional isocyanate compound, a glycidyl compound, a compound having a carboxy group, and a compound having an oxazoline group.

Examples of polyfunctional isocyanate compounds, the glycidyl compound, the compound having a carboxy group, or the compound having an oxazoline group include a polyfunctional isocyanate compound, a glycidyl compound, a compound having a carboxy group, and a compound having an oxazoline group, which are described above as examples of a crosslinking agent used for forming a crosslinked structure of a cationic polymer. Of these compounds, a polyfunctional isocyanate compound is preferable in terms of having high reactivity with a cationic polymer and being likely to form a crosslinked structure.

An example of the compound having reactivity with an anionic polymer is at least one compound selected from the group consisting of a glycidyl compound and a compound having an oxazoline group. Examples of the glycidyl compound or the compound having an oxazoline group include a glycidyl compound and a compound having an oxazoline group which are described above as examples of a crosslinking agent used for forming a crosslinked structure of a cationic polymer. Of these compounds, a glycidyl compound is preferable in terms of having high reactivity with an anionic polymer.

When the second adhesive layer 12b contains an acid-modified polyolefin resin, it is preferable that the reactive compound also has reactivity with an acidic group in the acid-modified polyolefin resin (that is, form a covalent bond with the acidic group). This further enhances adhesion with the second anti-corrosion treatment layer 14b. In addition, the acid-modified polyolefin resin becomes a crosslinked structure, which further improves solvent resistance of the packaging material 10.

The content of the reactive compound is preferably 1 to 10 equivalents relative to an acidic group in the acid-modified polyolefin resin. When the content is not less than 1 equivalent, the reactive compound sufficiently reacts with an acidic group in the acid-modified polyolefin resin. When the content exceeds 10 equivalents, the crosslinking reaction with the acid-modified polyolefin resin has been already sufficiently saturated, and therefore an unreacted product remains, which raises the concern that various performances may deteriorate. Therefore, for example, the content of the reactive compound is preferably 5 to 20 parts by mass (solid content ratio) relative to 100 parts by mass of the acid-modified polyolefin resin.

The acid-modified polyolefin resin is obtained by introducing an acidic group into a polyolefin resin. Examples of the acidic group include a carboxy group, a sulfonic acid group, and an acid anhydride group, and a maleic anhydride group and a (meth)acrylic group are particularly preferable. As the acid-modified polyolefin resin, there can be used, for example, one similar to the modified polyolefin resin used for the sealant layer 16.

The second adhesive layer 12b may contain various additives such as a flame retardant, a slip agent, an anti-blocking agent, an antioxidant, a light stabilizer, and a tackifier.

From the viewpoint of suppressing deterioration in lamination strength associated with corrosive gas, such as hydrogen sulfide, and an electrolyte and from the viewpoint of further suppressing deterioration in insulation properties, the second adhesive layer 12b may contain, for example, an acid-modified polyolefin and at least one curing agent selected from the group consisting of a polyfunctional isocyanate compound, a glycidyl compound, a compound having a carboxy group, a compound having an oxazoline group, and a carbodiimide compound. Examples of the carbodiimide compound include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, and N,N'-di-p-tolylcarbodiimide.

An example of an adhesive usable for forming the second adhesive layer 12b is a polyurethane-based adhesive formulated with polyisocyanate and a polyester polyol containing hydrogenated dimer fatty acid and diol. Examples of the adhesive include a polyurethane resin obtained by allowing an isocyanate compound having two or more functional groups to act on a base compound such as polyester polyol, polyether polyol, acrylic polyol, or carbonate polyol, and an epoxy resin obtained by allowing an amine compound or the like to act on a base compound having an epoxy resin, which are preferable from the viewpoint of heat resistance.

The thickness of the second adhesive layer 12b is not particularly limited, but preferably 1 to 10 μm and more preferably 2 to 7 μm, from the viewpoint of obtaining desired adhesion strength, processability, and others.

<Sealant Layer 16>

The sealant layer 16 provides the packaging material 10 with sealing properties by heat sealing, and is disposed on the inner side and heat sealed (thermally adhered) during assembly of a solid-state battery.

An example of the sealant layer 16 is a resin film formed of a polyolefin-based resin or a polyester-based resin. These resins (hereinafter, also referred to as "base resins") constituting the sealant layer 16 may be used singly or in combination of two or more.

Examples of the polyolefin-based resin include: a low-, medium- or high-density polyethylene; an ethylene-α-olefin copolymer; a polypropylene; a block or random copolymer containing propylene as a copolymerization component; and a propylene-α-olefin copolymer.

Examples of the polyester-based resin include a polyethylene terephthalate (PET) resin, a polybutylene terephthalate (PBT) resin, a polyethylene naphthalate (PEN) resin, a polybutylene naphthalate (PBN) resin, and copolymers thereof.

The sealant layer 16 may contain a polyolefin-based elastomer. Although the polyolefin-based elastomer may or may not have compatibility with the above-described base resins, it may contain both a compatible polyolefin-based elastomer having compatibility and an incompatible polyolefin-based elastomer having no compatibility. The expression "having compatibility (compatible)" refers to dispersing in the base resin with a dispersion phase size of not less than 1 nm and less than 500 nm. The expression "having no compatibility (incompatible)" refers to dispersing in the base resin with a dispersion phase size of not less than 500 nm and less than 20 μm.

When the base resin is a polypropylene-based resin, an example of the compatible polyolefin-based elastomer is a propylene-butene-1 random copolymer, and an example of the incompatible polyolefin-based elastomer is an ethylene-butene-1 random copolymer. Such polyolefin-based elastomers can be used singly or in combination of two or more.

Also, the sealant layer 16 may contain, as additives, a slip agent, an anti-blocking agent, an antioxidant, a light stabilizer, a flame retardant, and others. The content of these additives is preferably not more than 5 parts by mass when the total mass of the sealant layer 16 is 100 parts by mass.

The thickness of the sealant layer 16 is not particularly limited. However, from the viewpoint of achieving both thinning of a film and improvement of heat sealing strength under a high temperature environment, the thickness is preferably in the range of 5 to 100 µm, more preferably in the range of 10 to 100 µm, and further preferably in the range of 20 to 80 µm.

The sealant layer 16 may be either a single-layer film or a multi-layer film, which is selected depending on required functions.

<Color Developer>

At least one of the layers constituting the packaging material 10 of the present embodiment contains a color developer that reacts with hydrogen sulfide and changes in color. In the packaging material 10, the color developer may be contained in at least one layer selected from the group consisting of the first adhesive layer 12a, the second adhesive layer 12b, and the sealant layer 16. When the color developer is contained in one of the layers on the inner side (on the sealant layer 16 side) relative to the barrier layer 13, the color developer is preferably contained in the sealant layer 16. The innermost layer in the packaging material 10 is the sealant layer 16. Therefore, when the sealant layer 16 contains the color developer, hydrogen sulfide generated inside the packaging material 10 is likely to contact the color developer, and the color developer and the hydrogen sulfide react with each other so that the sealant layer 16 rapidly changes in color. Also, since the sealant layer 16 is usually thicker than the second adhesive layer 12b, color change, when the cross section of the packaging material 10 is observed, is more easily recognized when the color developer is contained in the sealant layer 16. The color developer may be contained in either only one or two or more of the layers constituting the packaging material 10.

The color developer may contain at least one element selected from the group consisting of Cu, Pb, Ag, Mn, Ni, Co, Sn, and Cd. These elements, in an ionized state, rapidly react with hydrogen sulfide and change in color. Cu and Ag react with hydrogen sulfide in the atmosphere and change color, even when they are in a metallic state. From the viewpoint of facilitating color change, the above-described elements preferably exist in an ionized state or in a state of being easily ionized.

The color developer may contain at least one selected from the group consisting of $CuSO_4$, $Pb(CH_3COO)_2$, and $Ag_2SO_4$. These compounds tend to be easily hydrated, and the metal elements tend to be easily ionized. Accordingly, the color developers containing the above-described compounds are likely to react with sulfur of hydrogen sulfide and change in color, and the color change is likely to be visually recognized. Therefore, the visual finding of an abnormality of a solid-state battery at an early stage is further facilitated. It should be noted that the above-described compounds may exist in a hydrated state.

A layer to which the color developer is to be added may have metal soap such as zinc stearate added, from the viewpoint of improving dispersibility of the color developer. Use of a combination of the color developer and metal soap can enhance dispersibility of the color developer in the layer, and facilitates suppression of unevenness in color change and suppression of deterioration in functions (for example, adhesiveness strength and sealing strength) of a layer that contains the color developer.

The color developer may be added to the sealant layer 16 or a later-described adhesive resin layer 15, by previously dispersing the color developer in resin such as polyethylene or polypropylene at a high concentration (for example, 30 mass % or more) to prepare a master batch, and mixing the master batch with another resin during extrusion lamination or the like. Further, the above-described metal soap may be added during the preparation of this master batch. The preparation of the master batch can enhance dispersibility of the color developer in the layer, and facilitates suppression of unevenness in color change and suppression of deterioration in functions (for example, adhesiveness strength and sealing strength) of a layer that contains the color developer.

The content of the color developer in a layer that contains the color developer may be, with respect to the total amount of the layer, 0.01 mass % or more and 30 mass % or less, 0.05 mass % or more and 20 mass % or less, or 0.1 mass % or more and 15 mass % or less. When the content of the color developer is not less than the above-described lower limit value, color change is further likely to be visually recognized. When not more than the above-described upper limit value, functions (such as adhesiveness strength and sealing strength) of the color-containing-layer can be prevented from deteriorating.

In a test, a layer that contains the color developer is cut into a size of 50 mm×50 mm, and the cut piece is enclosed in a container (such as a 2 L Tedlar bag) together with 2 L of $H_2S$ gas having a concentration of 5 ppm by mass and left to stand at room temperature (25° C.) for 72 hours. A color difference ($\Delta E$) before and after the test may be 0.5 or more. When the color difference ($\Delta E$) is not less than the above-described lower limit value, color change of the color-developer-containing layer is more easily visually recognized. Particularly, when the color developer is contained in one of the layers on the inner side (on the sealant layer 16 side) than the barrier layer 13, color change is likely to be visually recognized by observing the cross section of the packaging material 10. The color difference ($\Delta E$) can be measured by a colorimeter. The color difference ($\Delta E$) can be adjusted by the type and added amount of the color developer, the type and added amount of the hydrogen sulfide adsorbent when the same layer is added with the hydrogen sulfide adsorbent, and others.

<Hydrogen Sulfide Adsorbent>

At least one of the layers constituting the packaging material 10 of the present embodiment may contain the hydrogen sulfide adsorbent. As described herein, the hydrogen sulfide adsorbent refers to one which is different to the above-described color developer (that is, one that does not change in color even when it contacts hydrogen sulfide) and that can adsorb and/or decompose hydrogen sulfide. In the packaging material 10, the hydrogen sulfide adsorbent may be contained in at least one layer selected from the group consisting of the first adhesive layer 12a, the second adhesive layer 12b, and the sealant layer 16. The hydrogen sulfide adsorbent may be contained in either a layer that contains the color developer or a layer that does not contain the color developer. When the color developer is contained in one of the layers on the inner side (on the sealant layer 16 side) relative to the barrier layer 13, the hydrogen sulfide adsorbent is preferably contained in at least one of the color-developer-containing layer and layers disposed on the barrier layer 13 side relative to the color-developer-containing layer. That is, when the color developer is contained on the inner side than the barrier layer 13 in the packaging material 10, it is preferable that the color developer be contained in the sealant layer 16, and the hydrogen sulfide adsorbent be contained in the sealant layer 16 and/or the second adhesive layer 12b. Also, when the color developer is contained on the inner side relative to the barrier layer 13, the hydrogen sulfide adsorbent may be contained in the first adhesive layer 12a. The hydrogen sulfide adsorbent may be contained in either only one or two or more of the layers constituting the packaging material 10.

Examples of the hydrogen sulfide adsorbent include zinc oxide, amorphous metal silicates (mainly ones including copper or zinc as the metal), hydrates of zirconium and lanthanoid elements, tetravalent metal phosphates (particularly ones including copper as the metal), mixtures of zeolites and zinc ions, mixtures of zeolites, zinc oxide, and copper oxide (II), potassium permanganate, sodium permanganate, silver sulfate, silver acetate, aluminum oxide, iron hydroxide, isocyanate compounds, aluminum silicate, aluminum potassium sulfate, zeolites, activated carbon, amine-based compounds, and ionomers. From the viewpoint of further facilitating detoxification of hydrogen sulfide, as well as cost and handleability, the hydrogen sulfide adsorbent preferably contains zinc oxide (ZnO) and/or zinc ions. The hydrogen sulfide adsorbents may be used singly or in combination of two or more.

As the hydrogen sulfide adsorbent, the below-described deodorants having the effect of deodorizing hydrogen sulfide may be used. Specific examples include "Daimushu PE-M 3000-Z" (polyethylene masterbatch product) manufactured by Dainichiseika Color & Chemicals Mfg. Co., Ltd., "Kesumon" manufactured by Toagosei Co., Ltd., "Shu-Cleanse" manufactured by Rasa Industries, Ltd., and "Dushlite ZU" and "Dushlite CZU" manufactured by Sinanen Zeomic Co., Ltd.

When the hydrogen sulfide adsorbent is colored, the color tone preferably does not inhibit visual recognition of color change of the color developer and facilitates visual recognition of color change of the color developer. The color tone of the hydrogen sulfide adsorbent may be adjusted according to color tones before and after color change of the color developer used. For example, the hydrogen sulfide adsorbent being white or the like tends to facilitate visual recognition of color change of the color developer, and is therefore preferable. On the other hand, the hydrogen sulfide adsorbent being brown, black, or the like tends to inhibit visual recognition of color change of the color developer.

A layer to which the hydrogen sulfide adsorbent is to be added may have a metal soap such as zinc stearate added, from the viewpoint of improving dispersibility of the hydrogen sulfide adsorbent. Use of a combination of the hydrogen sulfide adsorbent and metal soap can enhance dispersibility of the hydrogen sulfide adsorbent in the layer, which inhibits the occurrence of unevenness in the effect of detoxification of hydrogen sulfide and facilitates the suppression of deterioration in functions (for example, adhesiveness strength and sealing strength) of a layer that contains the hydrogen sulfide adsorbent.

The hydrogen sulfide adsorbent may be previously masterbatched, similarly to the color developer. In adding the hydrogen sulfide adsorbent to the color-developer-containing layer, the hydrogen sulfide adsorbent and the color developer may be masterbatched.

The content of the hydrogen sulfide adsorbent in a layer that contains the hydrogen sulfide adsorbent may be, with respect to the total amount of the layer, 0.01 mass % or more and 30 mass % or less, 0.05 mass % or more and 20 mass % or less, or 0.1 mass % or more and 15 mass % or less. When the content of the hydrogen sulfide adsorbent is not less than the above-described lower limit value, the effect of detoxification of hydrogen sulfide is likely to be sufficiently obtained. When not more than the above-described upper limit value, deterioration in functions (such as adhesiveness strength and sealing strength) of the layer that contains the hydrogen sulfide adsorbent can be suppressed.

When both the color developer and the hydrogen sulfide adsorbent are contained in the same layer, the total content of the color developer and the hydrogen sulfide adsorbent in the layer may be, with respect to the total amount of the layer, 0.01 mass % or more and 30 mass % or less, 0.05 mass % or more and 20 mass % or less, or 0.1 mass % or more and 15 mass % or less. When this content is not less than the above-described lower limit value, the visual recognition of color change is further facilitated, and the effect of detoxification of hydrogen sulfide is likely to be sufficiently obtained. When not more than the above-described upper limit value, deterioration in functions (such as adhesiveness strength and sealing strength) of a layer that contains the color developer and the hydrogen sulfide adsorbent can be suppressed.

Preferred embodiments of the packaging material for solid-state batteries of the present embodiment have been described in detail. However, the present disclosure is not limited to the specific embodiments, which can be variously modified or changed within the spirit of the present disclosure recited in the claims.

For example, in FIG. 1, the anti-corrosive treatment layers 14a and 14b are disposed on both surfaces of the barrier layer 13. However, only one of the anti-corrosive treatment layers 14a and 14b may be provided, or the anti-corrosive treatment layer may not be provided.

When the color developer is contained in one of the layers on the inner side (on the sealant layer 16 side) relative to the barrier layer 13, a part of the layer that contains the color developer may be exposed in order to facilitate recognition of color change of the layer that contains the color developer. For example, a cutout part may be disposed to the packaging material 10 such that a part of the layer that contains the color developer is exposed. Alternatively, the shape of the layer that contains the color developer may be configured such that a part of the layer projects above other layers. Further alternatively, the color-developer-containing layer and another layer may be laminated in a displaced manner such that a part of the color-developer-containing layer is exposed.

In FIG. 1, the second adhesive layer 12b is used to laminate the barrier layer 13 and the sealant layer 16. However, as in a packaging material 20 for solid-state batteries shown in FIG. 2, an adhesive resin layer 15 may be used to laminate the barrier layer 13 and the sealant layer 16. Also, in the packaging material 20 for solid-state batteries shown in FIG. 2, the second adhesive layer 12b may be disposed between the barrier layer 13 and the adhesive resin layer 15.

<Adhesive Resin Layer 15>

The adhesive resin layer 15 is roughly configured to contain an adhesive resin composition as the main component and, as necessary, additive components. The adhesive resin composition is not particularly limited, but preferably contains a modified polyolefin resin.

The modified polyolefin resin is preferably a polyolefin resin graft-modified with an unsaturated carboxylic acid derivative derived from one of an unsaturated carboxylic acid, and an acid anhydride and an ester thereof.

Examples of the polyolefin resin include low-density polyethylene, medium-density polyethylene, high-density polyethylene, an ethylene-α-olefin copolymer, homopolypropylene, block polypropylene, random polypropylene, and a propylene-α-olefin copolymer.

The modified polyolefin resin is preferably a polyolefin resin modified with maleic anhydride. Suitable examples of the modified polyolefin resin are "Admer" manufactured by Mitsui Chemicals Corporation and "Modic" manufactured by Mitsubishi Chemical Corporation. Such modified polyolefin resins exhibit good reactivity with various metals and polymers having various functional groups, and thus can impart adhesiveness to the adhesive resin layer 15 taking advantage of the reactivity. The adhesive resin layer 15 may further contain, as necessary, various additives such as various compatible or incompatible elastomers, flame retardants, slip agents, anti-blocking agents, antioxidants, light stabilizers, and tackifiers.

The thickness of the adhesive resin layer 15 is not particularly limited, but is preferably the same as or less than that of the sealant layer 16, from the viewpoint of stress relaxation and moisture permeability.

In the packaging material 20 for solid-state batteries, the total thickness of the adhesive resin layer 15 and the sealant layer 16 is preferably in the range of 5 to 100 µm and more preferably in the range of 20 to 80 µm, from the viewpoint of achieving both the thinning of a film and the improvement of heat sealing strength under high temperature environment.

In the packaging material 20, the color developer and/or the hydrogen sulfide adsorbent may be contained in the adhesive resin layer 15. In the packaging material 20, the color developer and/or the hydrogen sulfide adsorbent may be contained in at least one layer selected from the group consisting of the first adhesive layer 12a, the adhesive resin layer 15, and the sealant layer 16.

Figure 3:
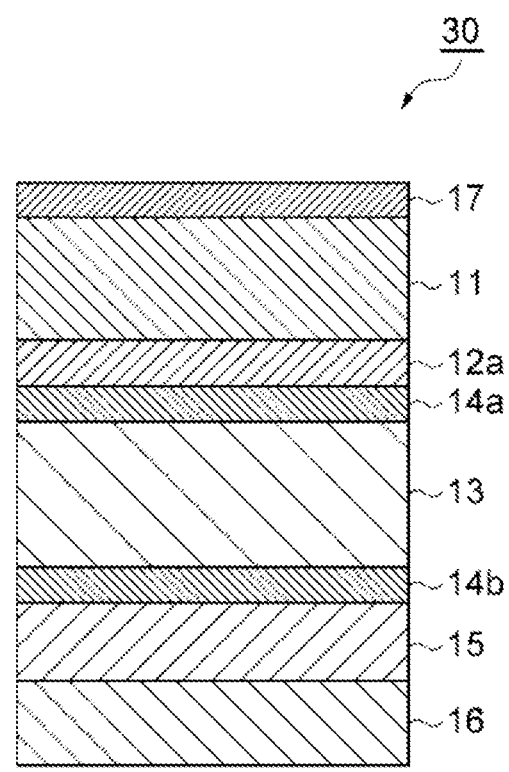
FIG. 3 is a schematic cross-sectional view of a packaging material for solid-state batteries according to an embodiment of the present disclosure.

The packaging material of the present disclosure may further include, like a packaging material 30 for solid-state batteries shown in FIG. 3, a protective layer 17 on a surface opposite the barrier layer 13 of the substrate layer 11. In FIG. 3, the adhesive resin layer 15 may be the second adhesive layer 12b.

<Protective Layer 17>

The protective layer 17 is a layer that protects the substrate layer 11. As a material for constituting the protective layer 17, a material similar to that of the first adhesive layer 12a can be used. The protective layer 17 can be formed on the substrate layer 11 by coating or the like.

In the packaging material 30, the color developer and/or the hydrogen sulfide adsorbent may be contained in the protective layer 17. In the packaging material 30, the color developer and/or the hydrogen sulfide adsorbent may be contained in at least one layer selected from the group consisting of the protective layer 17, the first adhesive layer 12a, the adhesive resin layer 15, and the sealant layer 16.

When the color developer is contained in one of the layers on the outer side (on the substrate layer 11 side) than the barrier layer 13 in the packaging material 30, the color developer may be contained in either the protective layer 17 or the first adhesive layer 12a, depending on the purpose. When the color developer is contained in the protective layer 17, which is the outermost layer in the packaging material 10, any abnormality occurring in one of solid-state batteries within a solid-state battery module and resulting in leakage of hydrogen sulfide can be easily found, and the solid-state battery having the abnormality can be easily identified. On the other hand, when the color developer is contained in the first adhesive layer 12a, a defect such as a pinhole occurring in the barrier layer 13 causes the first adhesive layer 12a to significantly change in color around the defect portion. This facilitates locating the abnormality in a solid-state battery and identification of the defect portion. The color developer may be contained in both the protective layer 17 and the adhesive layer 12a.

[Method of Producing Packaging Material]

Next, an example of a method of producing the packaging material 10 shown in FIG. 1 will be described. The method of producing the packaging material 10 is not limited to the method described below.

The method of producing the packaging material 10 of the present embodiment includes a step of disposing anti-corrosion treatment layers 14a and 14b on a barrier layer 13, a step of laminating a substrate layer 11 and the barrier layer 13 using a first adhesive layer 12a, a step of further laminating a sealant layer 16 via a second adhesive layer 12a to prepare a laminate, and, as necessary, a step of aging the resultant laminate.

(Step of Laminating Anti-Corrosion Treatment Layers 14a and 14b on Barrier Layer 13)

The present step is a step of forming anti-corrosion treatment layers 14a and 14b on a barrier layer 13. Examples of a method therefor include, as described above, performing a degreasing treatment, a hydrothermal modification treatment, an anodic oxidation treatment, or a chemical conversion treatment to the barrier layer 13, and applying a coating agent having anti-corrosion performance onto the barrier layer 13.

When the anti-corrosion treatment layers 14a and 14b are multilayers, for example, a coating liquid (coating agent) for constituting an anti-corrosion treatment layer on the lower side (on the barrier 13 side) may be applied on the barrier layer 13 and baked to form a first layer, and thereafter a coating liquid (coating agent) for constituting an anti-corrosion treatment layer on the upper side may be applied on the first layer and baked to form a second layer.

Degreasing treatment may be performed by a spray method or an immersion method. Hydrothermal modification treatment and anodic oxidation treatment may be performed by an immersion method. Chemical conversion treatment may be performed by appropriately selecting an immersion method, a spray method, a coating method, or the like depending on the type of chemical conversion treatment.

Usable coating methods for applying a coating agent having anti-corrosion performance can be various methods such as gravure coating, reverse coating, roll coating, and bar coating.

As described above, each treatment can be performed on either both surfaces or one surface of a metal foil. When performed on one surface, the treatment is preferably performed on a side to be laminated to the sealant layer 16. If needed, the treatment may also be performed to the surface of the substrate layer 11.

The amounts of the coating agents for forming the first and second layers are each preferably 0.005 to 0.200 g/m$^2$ and more preferably 0.010 to 0.100 g/m$^2$.

Dry curing, if necessary, may be performed at a base material temperature ranging from 60 to 300° C. depending on the drying condition of the anti-corrosion treatment layers 14a and 14b used.

(Step of Bonding Substrate Layer 11 and Barrier Layer 13)

The present step is a step of bonding the barrier layer 13 provided with the anti-corrosion treatment layers 14a and 14b and a substrate layer 11 via a first adhesive layer 12a. Bonding is performed using a method such as dry lamination, non-solvent lamination, or wet lamination to bond the layers with the material for forming the first adhesive layer 12a described above. The dry coating weight of the first adhesive layer 12a is preferably in the range of 1 to 10 g/m$^2$ and more preferably in the range of 2 to 7 g/m$^2$.

(Step of Laminating Second Adhesive Layer 12b and Sealant Layer 16)

The present step is a step of bonding a sealant layer 16 to the second anti-corrosion treatment layer 14b side of the barrier layer 13 via a second adhesive layer 12b. The bonding method may be wet processing, dry lamination, or the like.

In the wet process, a solution or a dispersion of the adhesive for forming the second adhesive layer 12b is applied onto the second anticorrosion treatment layer 14b and the solvent is evaporated at a predetermined temperature, followed by drying, which may be further followed by baking if necessary, to form a film. Then, a sealant layer 16 is laminated to produce the packaging material 10. The coating method may be any of the coating methods described above as examples. The preferable dry coating weight of the second adhesive layer 12b is the same as that of the first adhesive layer 12a.

In this case, the sealant layer 16 can be produced, for example, through a melt extrusion molding machine, using a resin composition for forming a sealant layer, which contains the above-described constituent ingredients of the sealant layer 16. In the melt extrusion molding machine, the processing speed can be 80 m/min or more, from the viewpoint of productivity.

(Step of Aging)

The present step is a step of aging (curing) the laminate. Aging the laminate can promote adhesion among barrier layer 13/second anti-corrosion treatment layer 14b/second adhesive layer 12b/sealant layer 16. Aging may be performed in the range from room temperature to 100° C. The aging time may be, for example, 1 to 10 days.

In this manner, the packaging material 10 of the present embodiment, as shown in FIG. 1, can be produced.

Next, an example of a method of producing the packaging material 20 shown in FIG. 2 will be described. The method of producing the packaging material 20 is not limited to the following method.

The method of producing the packaging material 20 of the present embodiment includes a step of disposing anti-corrosion treatment layers 14a and 14b on a barrier layer 13, a step of laminating a substrate layer 11 and the barrier layer 13 using a first adhesive layer 12a, a step of further laminating an adhesive resin layer 15 and a sealant layer 16 to prepare a laminate, and, as necessary, a step of heating the resultant laminate. Up to the step of bonding a substrate layer 11 and the barrier layer 13, the procedure is the same as the above-described method of producing the packaging material 10.

(Step of Laminating Adhesive Resin Layer 15 and Sealant Layer 16)

In this step, the adhesive resin layer 15 and the sealant layer 16 are formed on the second anticorrosion treatment layer 14b formed in the earlier step. The adhesive resin layer 15 and the sealant layer 16 may be formed on the second anticorrosion treatment layer 14b by sandwich laminating the adhesive resin layer 15 together with the sealant layer 16 using an extrusion laminator. Alternatively, the adhesive resin layer 15 and the sealant layer 16 may be laminated by tandem lamination or co-extrusion in which the adhesive resin layer 15 and the sealant layer 16 are extruded. When the adhesive resin layer 15 and the sealant layer 16 are formed, for example, the components are mixed so that the adhesive resin layer 15 and the sealant layer 16 are configured as described above. The sealant layer 16 is formed using the above-described resin composition for forming a sealant layer.

Figure 2:
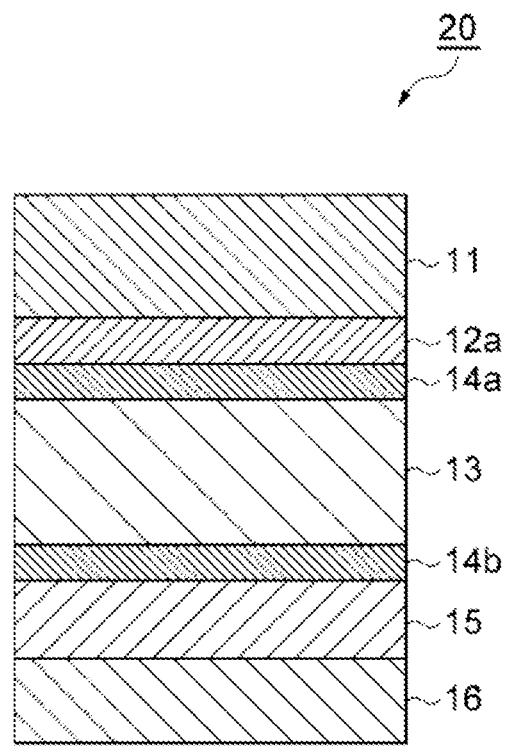
FIG. 2 is a schematic cross-sectional view of a packaging material for solid-state batteries according to an embodiment of the present disclosure.

Through this step, there is obtained a laminate, as shown in FIG. 2, in which the layers of substrate layer 11/first adhesive layer 12a/first anti-corrosion treatment layer 14a/barrier layer 13/second anti-corrosion treatment layer 14b/adhesive resin layer 15/sealant layer 16 are laminated in this order.

The adhesive resin layer 15 may be laminated by directly extruding, through an extrusion laminator, a material which has been dry-blended to have the above-described material formulation composition. Alternatively, the adhesive resin layer 15 may be laminated by extruding, through an extrusion laminator, a granulated substance which has been previously melt-blended using a melt blender such as a single-screw extruder, a twin-screw extruder, and a Brabender mixer.

The sealant layer 16 may be laminated by directly extruding, through an extrusion laminator, a material which has been dry-blended to have the material formulation composition described above as constituent ingredients of the resin composition for forming the sealant layer. Alternatively, the adhesive resin layer 15 and the sealant layer 16 may be laminated by a tandem lamination method or a co-extrusion method, in which the adhesive resin layer 15 and the sealant layer 16 are extruded through an extrusion laminator, using a granulated substance which has been previously melt-blended using a melt blender such as a single-screw extruder, a twin-screw extruder, and a Brabender mixer. Moreover, a sealant monolayer film may be previously formed as a cast film using the resin composition for forming the sealant layer, and this film may be laminated together with an adhesive resin by a sandwich-lamination method. The formation speed (processing speed) of the adhesive resin layer 15 and the sealant layer 16 can be, for example, 80 m/min or more, from the viewpoint of productivity.

(Step of Heating)

The present step is a step of heating the laminate. Heating the laminate can improve adhesiveness among barrier layer 13/second anti-corrosion treatment layer 14b/adhesive resin layer 15/sealant layer 16. The method for heating is preferably treating at least at a temperature higher than the melting point of the adhesive resin layer 15.

In this manner, the packaging material 20 of the present embodiment, as shown in FIG. 2, can be produced.

Preferred embodiments of the packaging material for solid-state batteries of the present disclosure have been described in detail. However, the present disclosure is not limited to such specific embodiments, which can be variously modified or changed within the spirit of the present disclosure recited in the claims.

[Solid-State Battery]

Figure 4:
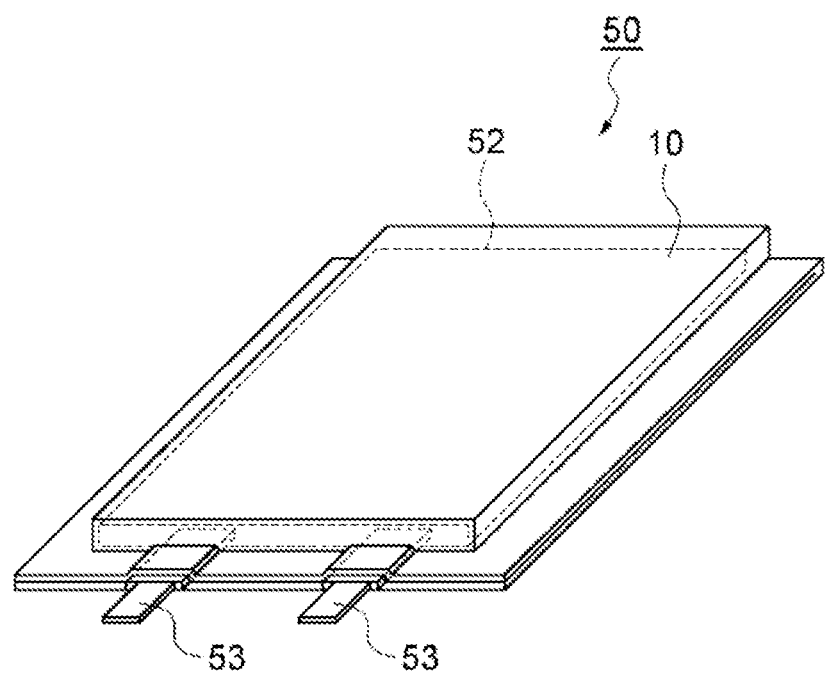
FIG. 4 is a perspective view of a solid-state battery according to an embodiment of the present disclosure.

FIG. 4 is a perspective view showing an embodiment of a solid-state battery prepared using the above-described packaging material. As shown in FIG. 4, a solid-state battery 50 includes a battery element 52, two metal terminals (current-extracting terminals) 53 for externally extracting a current from the battery element 52, and the packaging material 10 which encloses the battery element 52 in an airtight state. The packaging material 10 is the above-described packaging material 10 according to the present embodiment and is used as a container for housing the battery element 52. In the packaging material 10, the substrate layer 11 is the outermost layer, and the sealant layer 16 is the innermost layer. That is, the packaging material 10 is configured to enclose the battery element 52 therein, by folding one laminate film into two, with the substrate layer 11 on the outer side of the solid-state battery 50 and the sealant layer 16 on the inner side of the solid-state battery 50, and thermally bonding the edges, or by stacking two laminate films on each other and thermally bonding the edges. The metal terminals 53 are sandwiched by and enclosed in the packaging material 10 which serves as a container with the sealant layer 16 on the inner side. The metal terminals 53 may be sandwiched by the packaging material 10 via a tab sealant. It should be noted that the solid-state battery 50 may include the packaging material 20 or the packaging material 30 instead of the packaging material 10.

The battery element 52 includes positive and negative electrodes and a sulfide-based solid electrolyte disposed therebetween. The metal terminals 53 are each a part, of a current collector, taken out to the outside of the packaging material 10 and made of a metal foil such as a copper foil or an aluminum foil. In the solid-state battery 50 of the present embodiment, a color-developer-containing layer of the packaging material 10 changes in color in response to hydrogen sulfide generated from the battery element 52, and therefore an abnormality of the solid-state battery 50 can be visually detected at an early stage.

EXAMPLES

Hereinafter, the present disclosure will be more specifically described by way of examples. However, the present disclosure is not limited to the following examples.
[Materials Used]
Materials used in examples and comparative examples will be described below.
<Protective Layer (Thickness: 3 μm)>
A composition for forming a protective layer, obtained by formulating a Takenate™ A-50 (manufactured by Mitsui Chemicals, Inc.) as a curing agent to a Vylon® UR1400 (manufactured by Toyobo Co., Ltd.) as a base compound, was used.
<Substrate Layer (Thickness: 15 μm)>
A Nylon (Ny) film (manufactured by Toyobo Co., Ltd.) was used.
<First Adhesive Layer (thickness: 5 μm)>
A polyurethane-based adhesive (manufactured by Toyo Ink Co., Ltd.), obtained by formulating a tolylene diisocyanate adduct-based curing agent to a polyester polyol-based base compound, was used.
<First Anti-Corrosion Treatment Layer (Substrate Layer Side) and Second Anti-Corrosion Treatment Layer (Sealant Layer Side)>
(CL-1): A sodium polyphosphate-stabilized cerium oxide sol was used. The solid content concentration of the sodium polyphosphate-stabilized cerium oxide sol was adjusted to 10 mass % using distilled water as a solvent. The sodium polyphosphate-stabilized cerium oxide sol was obtained by mixing 10 parts by mass of sodium salt of phosphoric acid with respect to 100 parts by mass of cerium oxide.
(CL-2): A composition composed of 90 mass % of polyallylamine (manufactured by Nitto Boseki Co., Ltd.) and 10 mass % of polyglycerol polyglycidyl ether (manufactured by Nagase Chemtex Corporation) was used. The solid content concentration of the composition was adjusted to 5 mass % using distilled water as a solvent.
<Barrier Layer (Thickness: 40 μm)>
An annealed and degreased soft aluminum foil (8079 manufactured by Toyo Aluminium K.K.) was used.
<Adhesive Resin Layer (Thickness: 20 μm)>
As the adhesive resin, a random polypropylene (PP)-based acid-modified polypropylene resin composition (manufactured by Mitsui Chemicals, Inc.) was used.

<Sealant Layer (Thickness: 60 μm)>
As the sealant layer forming resin composition, a polypropylene-polyethylene random copolymer (manufactured by Prime Polymer Co., Ltd., trade name: F744NP) was used.
<Color Developer>
In examples, the below-described color developers a to c were added to the protective layer, the first adhesive layer, the adhesive resin layer, or the sealant layer. The presence or absence of addition and the formulation amount are indicated in Table 1. The formulation amount refers to a ratio (mass %) relative to the total amount (100 mass %) of each layer. The color developer was mixed with a material for constituting each layer when used.
Color developer a: lead acetate ($Pb(CH_3COO)_2$)
Color developer b: copper sulfate ($CuSO_4$)
Color developer c: silver sulfate ($Ag_2SO_4$)
<Hydrogen Sulfide ($H_2S$) Adsorbent>
In some of examples and comparative examples, the below-described hydrogen sulfide adsorbents a to c were added to the first adhesive layer, the adhesive resin layer, or the sealant layer. The presence or absence of addition and the formulation amount are indicated in Table 1. The formulation amount refers to a ratio (mass %) relative to the total amount (100 mass %) of each layer. The hydrogen sulfide adsorbent was mixed with a material for constituting each layer when used. In adding the color developer and/or the hydrogen sulfide adsorbent to the adhesive resin layer or the sealant layer, the color developer and/or the hydrogen sulfide adsorbent was previously mixed with a part of a resin for constituting the adhesive resin layer or the sealant layer, and thereafter the mixture was mixed with the remaining material for constituting each layer. In adding the color developer and/or the hydrogen sulfide adsorbent to the first adhesive layer, the color developer and/or the hydrogen sulfide adsorbent was mixed with a base compound for constituting the first adhesive layer, and thereafter the mixture was mixed with a curing agent.
Hydrogen sulfide adsorbent a: zinc oxide (ZnO, white pigment)
Hydrogen sulfide adsorbent b: manufactured by Dainichiseika Color & Chemicals Mfg. Co., Ltd., trade name: Daimushu PE-M3000-Z (polyethylene masterbatch product)
Hydrogen sulfide adsorbent c: manufactured by Toagosei Co., Ltd., trade name: Kesumon NS10C (general-purpose deodorant)
[Preparation of Packaging Material]

Examples 1 to 4 and 7 to 17

First, first and second anticorrosion treatment layers were formed on a barrier layer by the following procedure. Specifically, the material (CL-1) was applied to both surfaces of the barrier layer by micro gravure coating so that the dry coating amount of the material (CL-1) was 70 mg/m$^2$, followed by baking at 200° C. in a drying unit. Then, the material (CL-2) was applied onto the obtained layer by micro gravure coating so that the dry coating amount of the material (CL-2) was 20 mg/m$^2$, thereby forming a composite layer composed of the materials (CL-1) and (CL-2) as the first and second anticorrosion treatment layers. The two materials (CL-1) and (CL-2) became complexed to form the composite layer having corrosion resistance.

Next, the first anti-corrosion treatment layer side of the barrier layer provided with the first and second anti-corrosion treatment layers was dry-laminated to a substrate layer using a polyurethane-based adhesive (first adhesive layer). The barrier layer and the substrate layer were laminated by applying a polyurethane-based adhesive on the first anti-corrosion treatment layer side of the barrier layer with a thickness after curing of 5 µm, drying the coat at 80° C. for 1 minute, laminating the dried coat to a substrate layer, and aging the laminate at 60° C. for 72 hours.

Next, the laminate of the barrier layer and the substrate layer was set in an unwinding unit of an extrusion laminator, and an adhesive resin layer (thickness: 20 µm) and a sealant layer (thickness: 60 µm) were laminated in this order on the second anti-corrosion treatment layer by coextrusion under the processing conditions of 270° C. and 100 m/min. For the adhesive resin layer and the sealant layer, compounds of various materials were previously prepared using a twin-screw extruder and subjected to water cooling and pelletization processes, and the resultant products were used for the above-described extrusion lamination.

The thus-obtained laminate was heated such that the maximum attainable temperature of the laminate became 190° C., thereby producing a packaging material (laminate of substrate layer/first adhesive layer/first anti-corrosion treatment layer/barrier layer/second anti-corrosion treatment layer/adhesive resin layer/sealant layer). In each example, the color developer and/or the hydrogen sulfide adsorbent was added to the layer indicated in Table 1 in the formulation amount indicated in Table 1.

Examples 5 to 6

First, a composition for forming a protective layer was applied on a substrate layer by reverse coating and dried to form a protective layer having a thickness of 3 µm. Next, a laminate of a barrier layer and the substrate layer provided with the protective layer was obtained in the same manner as in Example 1. An adhesive resin layer and a sealant layer were laminated on the second anti-corrosion treatment layer in the obtained laminate of the protective layer, the substrate layer, and the barrier layer in the same method as in Example 1, and the resultant laminate was heated to prepare a packaging material (laminate of protective layer/substrate layer/first adhesive layer/first anti-corrosion treatment layer/barrier layer/second anti-corrosion treatment layer/adhesive resin layer/sealant layer). In each example, the color developer was added to the layer indicated in Table 1 in the formulation amount indicated in Table 1.

Example 18

A packaging material (laminate of substrate layer/first adhesive layer/first anti-corrosion treatment layer/barrier layer/second anti-corrosion treatment layer/adhesive resin layer/sealant layer) was prepared in the same manner as in Example 1, except that the used barrier layer was an annealed and degreased soft aluminum foil which was previously provided with pinholes at a density of one/5 cm square.

Comparative Example 1

A packaging material (laminate of substrate layer/first adhesive layer/first anti-corrosion treatment layer/barrier layer/second anti-corrosion treatment layer/adhesive resin layer/sealant layer) was prepared in the same manner as in Example 1, except that the color developer and the hydrogen sulfide adsorbent were not added to any layer.

Comparative Example 2

A packaging material (laminate of substrate layer/first adhesive layer/first anti-corrosion treatment layer/barrier layer/second anti-corrosion treatment layer/adhesive resin layer/sealant layer) was prepared in the same manner as in Comparative Example 1, except that the hydrogen sulfide adsorbent was added to the sealant layer in the formulation amount indicated in Table 1.

(Measurement of Outer Layer/Inner Layer Lamination Strengths)

A sample for measuring lamination strength was obtained by cutting the packaging material into a size of 15 mm×200 mm, and partly peeling between the barrier layer and the substrate layer for measuring outer layer lamination strength and between the barrier layer and the sealant layer for measuring inner layer lamination strength to form a portion for chucking a sample. Samples were subjected to a T-peel test under the condition of a pulling speed of 50 mm/min using a tensile tester (manufactured by Shimadzu Corporation). The measurement was performed under a room temperature (25° C.) environment. The results are indicated in Table 1.

[Measurement of Heat Sealing Strength]

Figure 5:
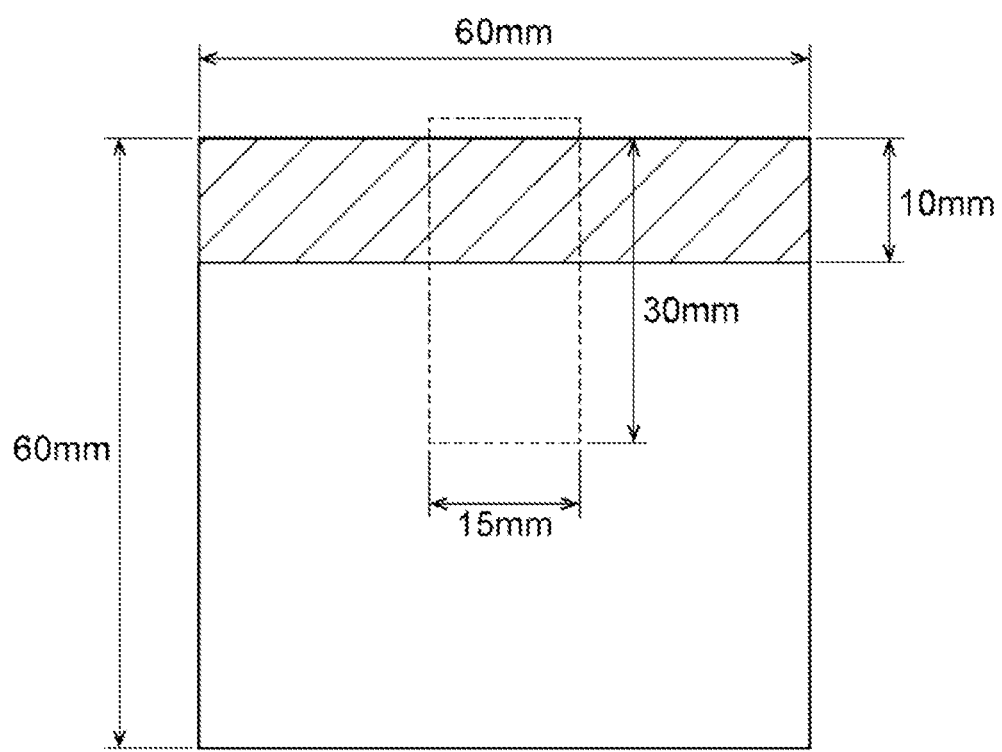
FIG. 5 is a schematic view illustrating a method of producing a sample for measuring heat seal strength in an example.

The packaging material was cut into a size of 120 mm×60 mm, and the cut piece was folded into halves with the sealant layer on the inner side. The ends opposite the folded portion were heat sealed along a width of 10 mm at 190° C./0.5 MPa/3 seconds, and the resultant product was stored at room temperature for 6 hours. Thereafter, the longitudinal center portion of the heat sealed portion was cut into 15 mm in width×30 mm (see FIG. 5) to prepare a sample for measuring heat sealing strength. The heat sealed portion of the sample was subjected to a T-peel test under the condition of a tensile speed of 50 mm/min using a tensile tester (manufactured by Shimadzu Corporation). The measurement was performed under a room temperature (25° C.) environment. The results are indicated in Table 1.

[Evaluation of Color Developing Properties]

The packaging material was cut into a size of 50 mm×50 mm to obtain a sample for evaluating color developing properties. This sample was subjected to one of the following tests (1) to (5). Thereafter, presence or absence of color change of the layer added with the color developer in the sample was visually observed. The color developing properties were judged as "A" when color change was observed and as "B" when color change was not observed. The results are indicated in Table 1

(1) When the Color Developer was Added to a Layer on the Inner Side (on the Sealant Layer Side) than the Barrier Layer (Examples 2 to 3, 7, and 16)

The sample was placed in a 2 L Tedlar bag and adhered to the Tedlar bag with the sealant layer side facing the inside of the bag. The periphery of the sample was fixed with a tape such that $H_2S$ did not circulate on the substrate layer side. In this state, the Tedlar bag was sealed. Two liters of a $H_2S$ gas having a concentration of 5 ppm by mass was allowed to flow into the Tedlar bag, which was left to stand at room temperature (25° C.) for 72 hours.

(2) When the Color Developer was Added to a Layer on the Outer Side (on the Substrate Layer Side) than the Barrier Layer (Examples 1, 5, 8 to 15, and 17)

The sample was placed in a 2 L Tedlar bag and adhered to the Tedlar bag with the substrate layer side or the protective layer side facing the inside of the bag. The periphery of the sample was fixed with a tape such that $H_2S$ did not circulate on the sealant layer side. In this state, the Tedlar bag was sealed. Two liters of a $H_2S$ gas having a concentration of 5 ppm by mass was allowed to flow into the Tedlar bag, which was left to stand at room temperature (25° C.) for 72 hours.

(3) When the Color Developer was Added Both Inside and Outside the Barrier Layer (Examples 4 and 6)

Both the tests (1) and (2) were performed, and judgements thereof were made. The color developing properties were judged as "A" when color change was observed in both of the tests and as "B" when color change was not observed in one or both of the tests.

(4) When the Barrier Layer having Pinholes was used (Example 18)

For detecting $H_2S$ passing through pinholes, the test (1) was performed.

(5) When the Color Developer was Not Added (Comparative Examples 1 to 2)

Both the tests (1) and (2) were performed, and judgements thereof were made. The color developing properties were judged as "A" when color change was observed in one or both of the tests and as "B" when color change was not observed in both of the tests.

[Evaluation of Hydrogen Sulfide ($H_2S$) Absorbability>

The packaging material was cut into a size of 50 mm×50 mm to obtain a sample for evaluating $H_2S$ absorbability. This sample was subjected to one of the following tests (1) to (3). Thereafter, the $H_2S$ concentration in the Tedlar bag was measured. The $H_2S$ absorbability was judged as "A" when the concentration is not more than 5 ppm by mass and as "B" when more than 5 ppm by mass. The results are indicated in Table 1.

(1) When the $H_2S$ Adsorbent was Added to a Layer on the Inner Side (on the Sealant Layer Side) Relative to the Barrier Layer (Examples 7 to 8, 10 to 13, and 17, and Comparative Example 2)

The sample was placed in a 2 L Tedlar bag and adhered to the Tedlar bag with the sealant layer side facing the inside of the bag. The periphery of the sample was fixed with a tape such that $H_2S$ did not circulate on the substrate layer side. In this state, the Tedlar bag was sealed. Two liters of a $H_2S$ gas having a concentration of 20 ppm by mass was allowed to flow into the Tedlar bag, which was left to stand at room temperature (25° C.) for 144 hours.

(2) When the $H_2S$ Adsorbent was Added to a Layer on the Outer Side (on the Substrate Layer Side) Relative to the Barrier Layer (Example 9)

The sample was placed in a 2 L Tedlar bag and adhered to the Tedlar bag with the substrate layer side or the protective layer side facing the inside of the bag. The periphery of the sample was fixed with a tape such that $H_2S$ did not circulate on the sealant layer side. In this state, the Tedlar bag was sealed. Two liters of a $H_2S$ gas having a concentration of 20 ppm by mass was allowed to flow into the Tedlar bag, which was left to stand at room temperature (25° C.) for 144 hours.

(3) When the $H_2S$ Adsorbent was Not Added (Examples 1 to 6, 14 to 16, and 18, and Comparative Example 1)

Both the tests (1) and (2) were performed, and judgement was made using the result having a lower $H_2S$ concentration.

TABLE 1

| | Protective layer Color developer | | First adhesive layer Color developer | | H2S adsorbent | | Adhesive resin layer Color developer | | H2S adsorbent | |
|---|---|---|---|---|---|---|---|---|---|---|
| | Type | Formulation amount (mass %) | Type | Formulation amount (mass %) | Type | Formulation amount (mass %) | Type | Formulation amount (mass %) | Type | Formulation amount (mass %) |
| Example 1 | — | — | a | 0.1 | — | — | — | — | — | — |
| Example 2 | — | — | — | — | — | — | a | 0.1 | — | — |
| Example 3 | — | — | — | — | — | — | — | — | — | — |
| Example 4 | — | — | a | 0.1 | — | — | — | — | — | — |
| Example 5 | a | 0.3 | — | — | — | — | — | — | — | — |
| Example 6 | a | 0.3 | — | — | — | — | — | — | — | — |
| Example 7 | — | — | — | — | — | — | — | — | — | — |
| Example 8 | — | — | a | 0.1 | — | — | — | — | a | 3 |
| Example 9 | — | — | a | 0.1 | a | 5 | — | — | — | — |
| Example 10 | — | — | b | 0.1 | — | — | — | — | — | — |
| Example 11 | — | — | c | 0.1 | — | — | — | — | — | — |
| Example 12 | — | — | a | 0.1 | — | — | — | — | — | — |
| Example 13 | — | — | a | 0.1 | — | — | — | — | — | — |
| Example 14 | — | — | a | 0.01 | — | — | — | — | — | — |
| Example 15 | — | — | a | 20.0 | — | — | — | — | — | — |
| Example 16 | — | — | a | — | — | — | — | — | — | — |
| Example 17 | — | — | a | 0.1 | — | — | — | — | — | — |
| Example 18 | — | — | a | 0.1 | — | — | — | — | — | — |
| Comparative Example 1 | — | — | — | — | — | — | — | — | — | — |
| Comparative Example 2 | — | — | — | — | — | — | — | — | — | — |

| | Sealant layer Color developer | | H2S adsorbent | | Outer layer lamination strength (N/15 mm) | Inner layer lamination strength (N/15 mm) | Heat sealing strength (N/15 mm) | Color developing properties | H2S absorbability |
|---|---|---|---|---|---|---|---|---|---|
| | Type | Formulation amount (mass %) | Type | Formulation amount (mass %) | | | | | |
| Example 1 | — | — | — | — | 4.2 | 8.3 | 32 | A | B |
| Example 2 | — | — | — | — | 4.5 | 8.0 | 32 | A | B |
| Example 3 | a | 0.1 | — | — | 4.4 | 8.3 | 31 | A | B |
| Example 4 | a | 0.1 | — | — | 4.1 | 8.4 | 33 | A | B |
| Example 5 | — | — | — | — | 4.5 | 8.2 | 33 | A | B |
| Example 6 | a | 0.1 | — | — | 4.6 | 8.4 | 32 | A | B |
| Example 7 | a | 0.1 | a | 3 | 4.4 | 8.2 | 31 | A | A |

TABLE 1-continued

| | | | | | | | | | |
|---|---|---|---|---|---|---|---|---|---|
| Example 8 | — | — | — | — | 4.1 | 7.8 | 31 | A | A |
| Example 9 | — | — | — | — | 4.2 | 8.2 | 33 | A | A |
| Example 10 | — | — | a | 3 | 4.0 | 8.3 | 32 | A | A |
| Example 11 | — | — | a | 3 | 4.1 | 8.2 | 32 | A | A |
| Example 12 | — | — | b | 3 | 4.2 | 8.5 | 31 | A | A |
| Example 13 | — | — | c | 5 | 4.1 | 8.3 | 31 | A | A |
| Example 14 | — | — | — | — | 4.5 | 8.4 | 33 | A | B |
| Example 15 | — | — | — | — | 3.2 | 8.4 | 33 | A | A |
| Example 16 | a | 30.0 | — | — | 4.3 | 8.4 | 29 | A | A |
| Example 17 | — | — | a | 3 | 4.4 | 8.3 | 28 | A | A |
| Example 18 | — | — | — | — | 4.3 | 8.2 | 33 | A | B |
| Comparative Example 1 | — | — | — | — | 4.2 | 8.3 | 33 | B | B |
| Comparative Example 2 | — | — | a | 5 | 4.2 | 8.2 | 12 | B | A |

INDUSTRIAL APPLICABILITY

According to the packaging material for solid-state batteries of the present disclosure, a layer that contains a color developer in the packaging material changes color in response to the generation of hydrogen sulfide, and therefore abnormalities of a solid-state battery can be visually detected at an early stage.

[Reference Signs List] 10, 20, 30 . . . Packaging material for solid-state batteries; 11 . . . Substrate layer; 12a . . . First adhesive layer; 12b . . . Second adhesive layer; 13 . . . Barrier layer; 14a . . . First anti-corrosion treatment layer; 14b . . . Second anti-corrosion treatment layer; 15 . . . Adhesive resin layer; 16 . . . Sealant layer; 17 . . . Protective layer; 50 . . . Solid-state battery; 52 . . . Battery element; 53 . . . Metal terminal.

What is claimed is:

1. A packaging material for a solid-state battery, comprising:
    a substrate layer constituting an outer side of the packaging material,
    a barrier layer on the substrate layer, and
    a sealant layer on the barrier layer, the sealant layer being an inner side of the packaging material, wherein
    the packaging material further comprises at least one of a first adhesive layer between the substrate layer and the barrier layer, a second adhesive layer between the barrier layer and the sealant layer, and an adhesive resin layer between the barrier layer and the sealant layer, wherein
    at least one layer selected from the group consisting of the first adhesive layer, the second adhesive layer and the adhesive resin layer comprises
    a color developer whose color changes when reacting with hydrogen sulfide, and the sealant layer comprises a hydrogen sulfide absorbent, which is different from the color developer, and
    wherein the packaging material comprises the first adhesive layer between the substrate layer and the barrier layer and the first adhesive layer comprises the color developer.

2. The packaging material for a solid-state battery of claim 1, wherein the color developer contains at least one element selected from the group consisting of Cu, Pb, Ag, Mn, Ni, Co, Sn, and Cd.

3. The packaging material for a solid-state battery of claim 1, wherein the color developer contains at least one selected from the group consisting of $CuSO_4$, $Pb(CH_3COO)_2$, and $Ag_2SO_4$.

4. The packaging material for a solid-state battery of claim 1, wherein the content of the color developer in a layer that contains the color developer is not less than 0.01 mass % and not more than 30 mass % relative to a total amount of the layer.

5. The packaging material for a solid-state battery of claim 1, wherein the hydrogen sulfide adsorbent contains zinc oxide and/or zinc ions.

6. The packaging material for solid-state battery of claim 1, wherein an anti-corrosion treatment layer is disposed on one or both surfaces of the barrier layer.

7. A solid-state battery, comprising:
    a battery element that contains a sulfide-based solid-state electrolyte;
    a current-extracting terminal extending from the battery element; and
    the packaging material for a solid-state battery of claim 1, which sandwiches the current-extracting terminal and houses the battery element.

8. The packaging material for solid-state battery of claim 1, wherein the first adhesive layer comprises 0.1 mass % to 20 mass % of the color developer.

9. The packaging material for solid-state battery of claim 8, wherein the color developer is selected from the group consisting of $CuSO_4$, $Pb(CH_3COO)_2$ and $Ag_2SO_4$.

10. The packaging material for solid state battery of claim 8, wherein the sealant layer contains 3 mass % to 5 mass % of the hydrogen sulfide adsorbent.

11. The packaging material for solid state battery of claim 9, wherein the sealant layer contains 3 mass % to 5 mass % of the hydrogen sulfide adsorbent.

12. The packaging material for solid state battery of claim 10, wherein the hydrogen sulfide adsorbent contains zinc oxide and/or zinc ions.

13. The packaging material for solid state battery of claim 11, wherein the hydrogen sulfide adsorbent contains zinc oxide and/or zinc ions.

* * * * *